S. G. BENNETT.
SAFETY APPLIANCE FOR MINES.
APPLICATION FILED OCT. 3, 1908.
996,049.
Patented June 27, 1911.
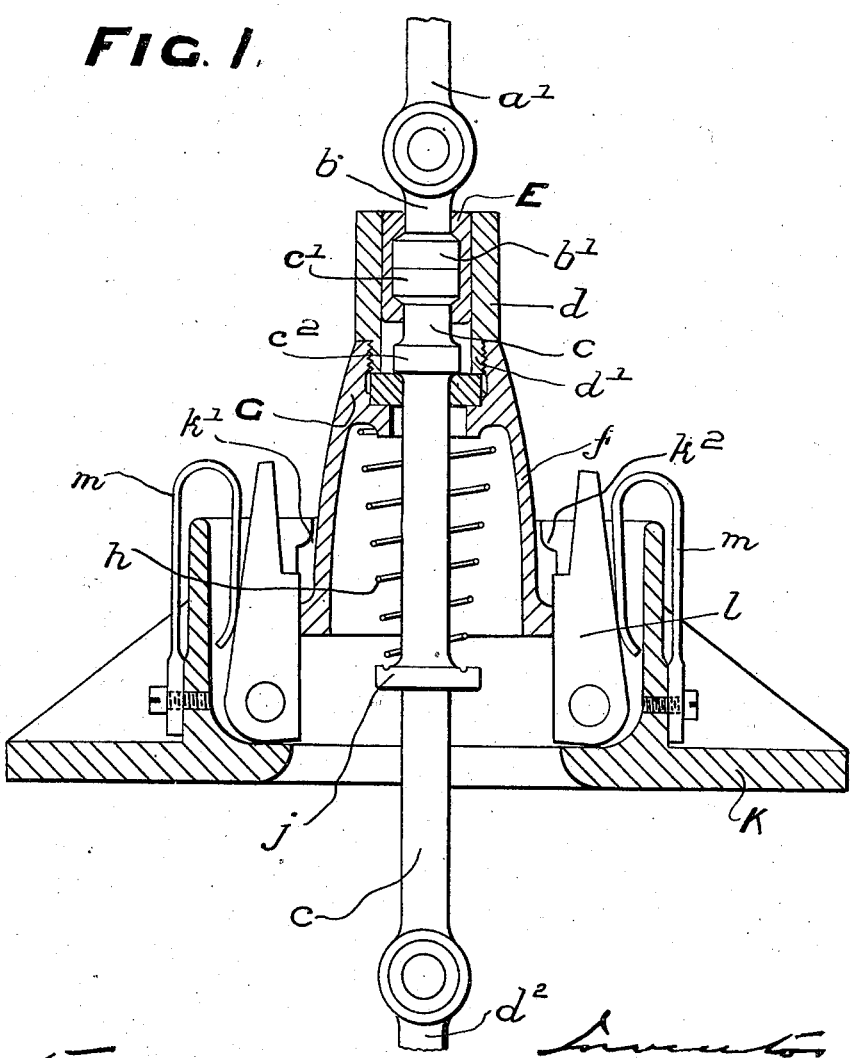

S. G. BENNETT.
SAFETY APPLIANCE FOR MINES.
APPLICATION FILED OCT. 3, 1908.
996,049.
Patented June 27, 1911.
2 SHEETS—SHEET 2.
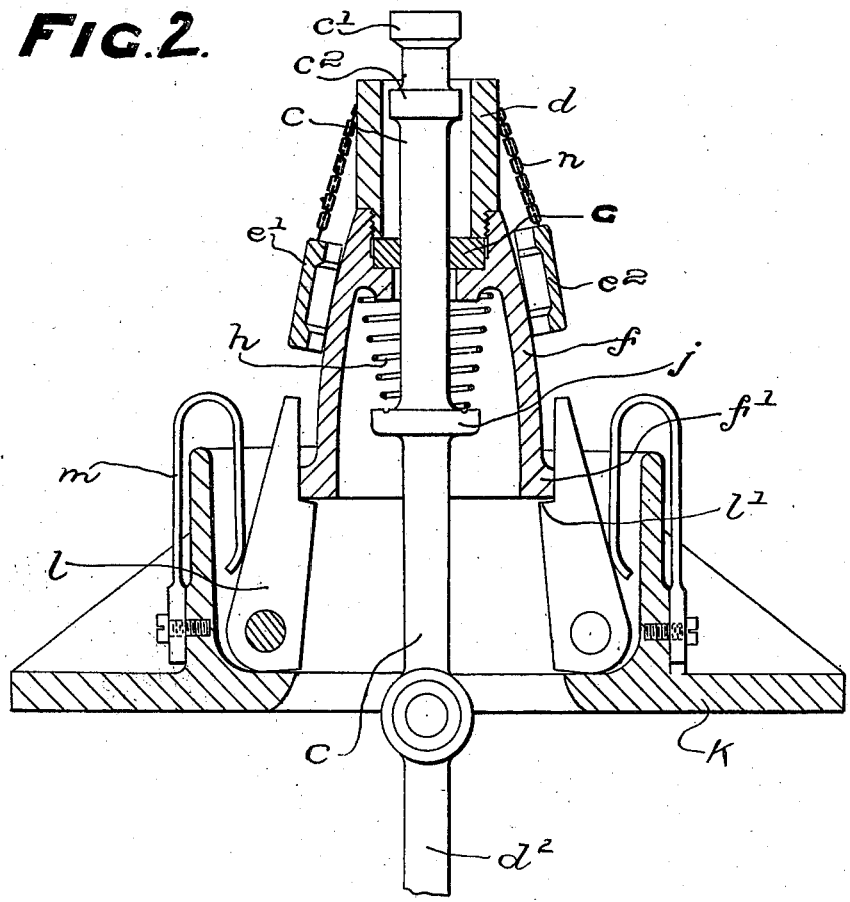

UNITED STATES PATENT OFFICE.

SAMUEL GREEN BENNETT, OF CHESTERFIELD, ENGLAND.

SAFETY APPLIANCE FOR MINES.

996,049. Specification of Letters Patent. Patented June 27, 1911.

Application filed October 3, 1908. Serial No. 456,048.

*To all whom it may concern:*

Be it known that I, SAMUEL GREEN BENNETT, a subject of the Kingdom of Great Britain, residing at The Laylands, Spital, Chesterfield, in the county of Derby, England, have invented certain new and useful Improvements in Safety Appliances for Mines, of which the following is a specification.

The object of this invention is to secure the absolute safety of the cage in the event of overwinding, by providing an arrangement which detaches the winding rope from the cage and at the same time securely holds the cage in position in the head gear of the pit.

In order that this invention may be clearly understood and more easily carried into practice, I have appended hereunto four sheets of drawings upon which I have illustrated the nature of my said invention:—

Figure 1 is a sectional elevation of the detaching device and is shown in a position immediately before coming into action. Fig. 2 is a similar view to Fig. 1 but shows the device in a position after the detachment of the rope therefrom.

In an embodiment of this invention such as illustrated by the drawings, the winding rope is attached to a hook $a'$ which is itself secured to a short circular spindle $b$ instead of being as usual attached to the bull chains which support the cage by means of an ordinary hook or as in some cases to a safety hook known as the "King's Hook." The lower end of this spindle $b$ is enlarged so as to form a collar $b'$ while another spindle $c$ similar in size but longer is also provided. The upper end of the lower spindle $c$ is also enlarged so as to form a collar $c'$ advantageously similar in size to the one on the upper spindle $b$, while the lower end of $c$ has a hook $d^2$ attached, to which the bull chains supporting the cage are fixed. The two adjacent collars $b'$, $c'$ of the spindles $b$ $c$ normally meet inside a short cylinder $d$.

In the interior of the cylinder $d$, a turned bush E is placed, such bush being in halves $e'$ $e^2$ and accurately fitting the inside of the cylinder $d$ although it is free to move inside same when required. The bush E is recessed to fit the two collars $b'$ $c'$ on the ends of the spindles $b$, $c$, the top and bottom holes of the bush E however being the same size as the diameter of the spindles $b$, $c$. When therefore the two collars $b'$ $c'$ have the bush E fitted around them, and the whole placed inside the cylinder $d$, the two spindles $b$ $c$ become practically one solid shaft, and so remain as long as they retain their position inside the cylinder $d$.

To the lower outer part $d'$ of the cylinder $d$ there is screwed a casting $f$ which may be hereinafter called a bell, since it resembles a bell in shape. The small or upper end of the said bell $f$ is recessed and the lower part $d'$ of the cylinder $d$ is screwed as said into the recess. In the bottom of this recess below the cylinder $d$ is accurately fitted a split collar G or stop in halves. The upper face of this split collar G fits against the underside of a second collar $c^2$ which is formed on or attached to the lower spindle $c$ a short distance below the collar $c'$ which is formed at the extreme end of the spindle. The object of the stop is to prevent the lower spindle falling through the bell in the event of overwinding as hereinafter described. A spring or springs $h$ fits over the lower spindle and abuts against the upper portion of the interior of the bell $f$, and downward for a convenient distance, one or more suitable stops $j$ being placed to hold the spring or springs $h$ in position.

Toward the top of the head gear of the pit a large plate K is fitted. This plate has a circular aperture $k'$ in the center, smaller toward the top than the outside diameter of the large end of the bell $f$. In the event of overwinding, the cage and the bell $f$, are carried upward until the latter comes in contact with the projecting shoulders $k^2$ of the plate K. As the bell is too large to pass through the hole its upward motion is arrested together with the cylinder to which it is attached. It is then prevented from falling by means of two or more arms $l$ pivoted to the above mentioned plate K. The said arms $l$ are arranged so that they project into the path of the bell $f$, springs $m$ serving to press them into such path until such time as the bell rises, whereupon the arms are forced back but as the arms have recesses or notches cut into their faces to form shoulders $l'$ the bell finally rests upon the latter. If preferred the pivoted arms may be arranged at various heights or planes so that they may come into operation one after the other, or any two of them simultaneously. While the upward motion of the bell and cylinder is thus stopped, the winding rope still continues its motion and as the upper and lower spindles $b$, $c$, are concurrently free to move upward inside the bell $f$ and cylinder $d$, the spiral spring or springs $h$ fitted around the lower spindle $c$ are compressed and the spindles continue to travel upward together with the beforementioned bush E inside the cylinder $d$. The moment that the bush arrives outside the top of the cylinder, the two parts fall asunder, owing to it being split, since the support of the interior of the cylinder is withdrawn and connection being broken the upper spindle is instantly separated from the lower one. In the event of the overwinding still continuing, the only part now attached to the winding rope is the short upper spindle which is secured to the hook to which the winding rope is attached.

The two halves $e'$ $e^2$ of the bush E may be secured to the cylinder $d$ by means of short chains $n$ or other suitable connections so that when they are released and fall apart they do not become lost by being flung to the ground. The lower spindle in the meantime remains suspended from the top and since the second collar $c^2$ is supported by the split stop G which thereby prevents its passage lower down the bell, the latter being itself supported by the aforedescribed arms $l$ arranged around the circular aperture in the top plate K, and thus the detaching gear together with the bull chains and the cage are sustained.

In order to facilitate the reassembling of the detaching gear after over-winding, in some cases instead of the circular aperture being smaller than the outside of the bell it is made larger, but pins are screwed into the rim of the casting surrounding the aperture and project sufficiently far into same to arrest the large end of the bell. The said projecting pins can be unscrewed to allow the bell and the parts attached thereto to be passed through the aperture and refitted for immediate use. In other cases the aperture is made larger than the diameter of the bell and an annular ring smaller in diameter than the bell is screwed to the upper side of the aperture so that it can be detached and the bell withdrawn. If desired copper or other shearing off bolts may be fitted through the cylinder to the bush E so as to prevent any movement of the bush in the cylinder until overwinding actually occurs, although so long as the bell does not come into contact with the obstruction in the top plate and thus have its motion stopped, the whole of the detaching gear travels with the winding rope as though it were integral therewith.

Having now described my invention, I declare that what I claim is:—

1. In the hereinbefore described device the combination of an attaching member for the winding rope, a suspending member for the cage, collars on the adjacent ends of the attaching and suspending members, a housing inclosing the adjacent ends of the attaching and suspending members, a divided bushing within the housing inclosing the collars, and stops to arrest the movement of the housing so that the bushing and attaching member can be withdrawn from the housing.

2. In the hereinbefore described device, an attaching member for the winding rope, a suspending member for the cage, collars on the adjacent ends of the attaching and suspending members, a housing, a divided bushing within the housing inclosing the collars, a second collar on the suspending member within the housing, and a stop forming part of the housing to prevent the separation of the suspending member therefrom in the event of overwinding.

3. In the hereinbefore described device, an attaching member for the winding rope, a suspending member for the cage, collars on the adjacent ends of the attaching and suspending members, a housing, a divided bushing within the housing inclosing the collars, a second collar on the suspending member within the housing, a stop forming part of the housing to prevent the separation of the suspending member therefrom in the event of overwinding, and stops to arrest the movement of the housing so that the bushing and attaching member can be withdrawn from the housing.

In witness whereof I have hereunto set my hand in the presence of two witnesses.

SAMUEL GREEN BENNETT.

Witnesses:
  LUTHER J. PARR,
  CHAS. N. DANIELS.

---

Copies of this patent may be obtained for five cents each, by addressing the "Commissioner of Patents, Washington, D. C."